United States Patent
Cordatos et al.

(10) Patent No.: US 10,495,002 B2
(45) Date of Patent: Dec. 3, 2019

(54) FILTER SCREENS AND METHODS OF MAKING FILTER SCREENS

(71) Applicant: Delavan Inc, West Des Moines, IA (US)

(72) Inventors: Haralambos Cordatos, Colchester, CT (US); Lev Alexander Prociw, Johnston, IA (US); Charles E. Reuter, Granby, CT (US); John D. Cannata, Marlborough, CT (US); Angelo Martucci, Bloomfiled, CT (US); Scott J. Beloncik, Westfield, MA (US)

(73) Assignee: Delavan Inc., West Des Moines, IA (US)

(*) Notice: Subject to any disclaimer, the term of this patent is extended or adjusted under 35 U.S.C. 154(b) by 615 days.

(21) Appl. No.: 15/210,829

(22) Filed: Jul. 14, 2016

(65) Prior Publication Data

US 2018/0016986 A1    Jan. 18, 2018

(51) Int. Cl.
```
F02C 7/224      (2006.01)
B01D 29/00      (2006.01)
B01D 29/01      (2006.01)
B01D 35/00      (2006.01)
B01D 39/20      (2006.01)
```
(Continued)

(52) U.S. Cl.
CPC .......... *F02C 7/224* (2013.01); *B01D 29/0095* (2013.01); *B01D 29/012* (2013.01); *B01D 35/005* (2013.01); *B01D 39/2027* (2013.01); *C09D 127/18* (2013.01); *F02C 7/14* (2013.01); *F02C 7/222* (2013.01); *B01D 2239/0478* (2013.01); *B01D 2239/1216* (2013.01); *F05D 2220/32* (2013.01); *F05D 2300/432* (2013.01); *F16L 58/1009* (2013.01)

(58) Field of Classification Search
CPC . F02C 7/224; F02C 7/222; F02C 7/14; B01D 29/0095; B01D 29/012; B01D 35/005; B01D 39/20; B01D 39/2027; B01D 2239/0478; B01D 2239/1216; C09D 127/18; F05D 2220/32; F05D 2300/432; F16L 58/1009
USPC .......................................................... 60/736
See application file for complete search history.

(56) References Cited

U.S. PATENT DOCUMENTS

| 4,699,715 A | 10/1987 | Lee, II |
| 5,677,031 A * | 10/1997 | Allan ................ B01D 39/1661 |
| | | 210/503 |

(Continued)

OTHER PUBLICATIONS

Extended European Search Report from European Patent Office (EPO) dated Nov. 20, 2017 for Application No. EP17173772.9.

*Primary Examiner* — Phutthiwat Wongwian
*Assistant Examiner* — Loren C Edwards
(74) *Attorney, Agent, or Firm* — Locke Lord LLP; Scott D. Wofsy; Georgi Korobanov

(57) ABSTRACT

A filter screen includes a plate body with an upstream surface, an opposed downstream surface, and an array of apertures extending between the upstream surface and the downstream surface. A polytetrafluoroethylene-based layer overlays the upstream surface between apertures of the aperture array, the polytetrafluorethylene-based layer being conformally disposed over the upstream surface of the plate body and spanning the upstream surface between the apertures of the aperture array to slow deposition of carbonaceous deposits on the filter screen.

20 Claims, 3 Drawing Sheets

(51) Int. Cl.
*C09D 127/18* (2006.01)
*F02C 7/14* (2006.01)
*F02C 7/22* (2006.01)
*F16L 58/10* (2006.01)

(56) References Cited

U.S. PATENT DOCUMENTS

| | | | | |
|---|---|---|---|---|
| 6,148,601 | A | * | 11/2000 | Jones ................ F02C 9/263 60/39.281 |
| 6,939,392 | B2 | * | 9/2005 | Huang ............ B01D 19/0031 55/385.1 |
| 2007/0235890 | A1 | * | 10/2007 | Pryce Lewis .......... B29C 33/56 264/39 |
| 2009/0044702 | A1 | | 2/2009 | Adamek et al. |
| 2010/0269504 | A1 | | 10/2010 | Gage et al. |
| 2012/0024403 | A1 | | 2/2012 | Gage et al. |
| 2014/0294558 | A1 | * | 10/2014 | Haugh .................. F01D 25/18 415/1 |

* cited by examiner

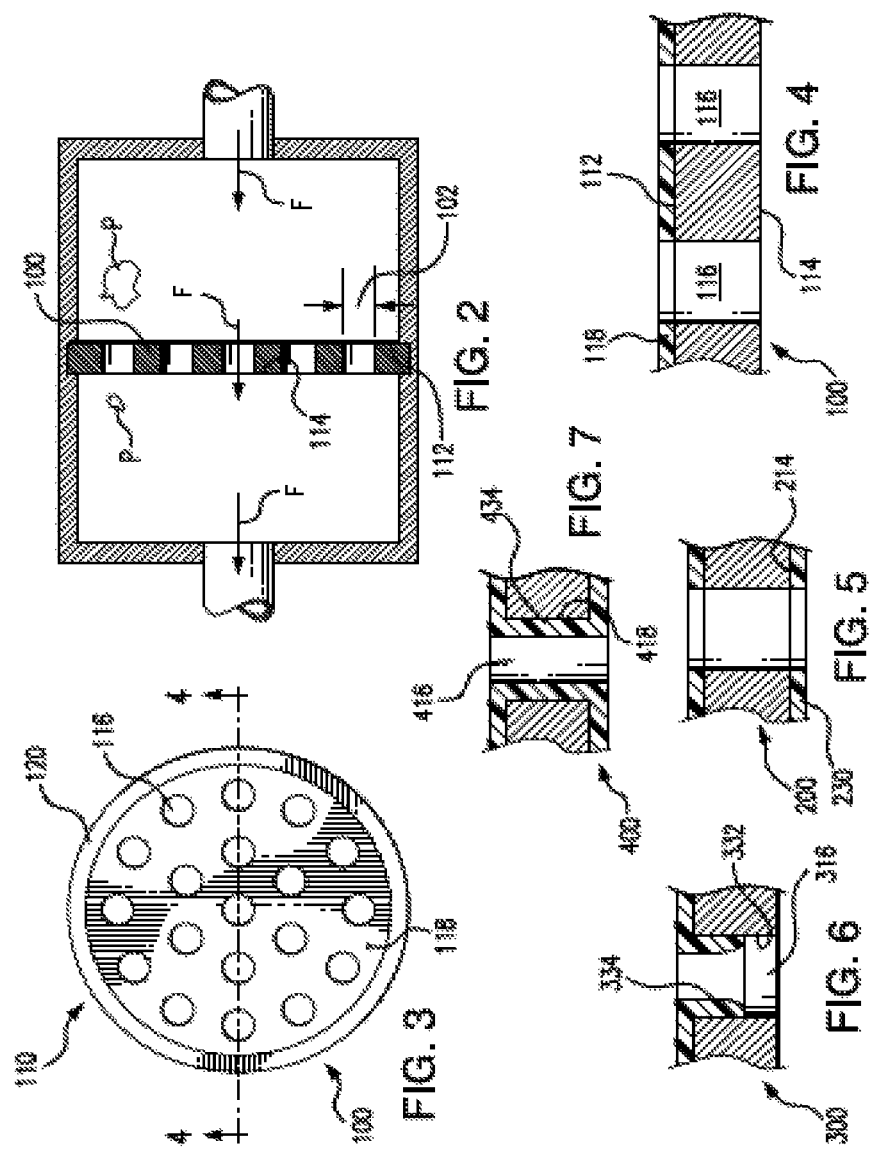

FILTER SCREENS AND METHODS OF MAKING FILTER SCREENS

BACKGROUND OF THE INVENTION

1. Field of the Invention

The present disclosure relates to fluid flow, and more particularly to fluid flow through fuel systems in gas turbine engines.

2. Description of Related Art

Gas turbine engines, such as aircraft main engines and auxiliary power units, commonly have fuel systems that convey hydrocarbon-based fuels to the combustor section of the gas turbine engine. In some gas turbine engines, the fuel system is also used to provide cooling for hot engine components and/or to provide actuation force for fluid-powered devices. Fuel in such systems may be recirculated or used for cooling prior to reaching the combustion section.

While heating fuel can be advantageous, such as by preventing ice formation within a fuel flow, heating fuel above a certain temperature threshold can increase the tendency of 'coking' within the fuel system. Coking typically involves the deposition of carbonaceous materials on fuel system internal structures, e.g., conduits, valve surfaces, and filter screens. Such carbonaceous depositions can accumulate over time, potentially binding together movable structures, occluding fuel system components, and/or affecting fuel flow through the fuel system. Coking can create a need for periodic maintenance and/or replacement of fuel system components, potentially reducing the availability of the gas turbine engine and/or aircraft mounting the gas turbine engine.

Such conventional methods and systems have generally been considered satisfactory for their intended purpose. However, there is still a need in the art for improved fuel system structures that resist coking at relatively high temperatures. The present disclosure provides a solution for this need.

SUMMARY OF THE INVENTION

A filter screen includes a plate body with an upstream surface, an opposed downstream surface, and an array of apertures extending between the upstream surface and the downstream surface. A polytetrafluoroethylene (PTFE)-based layer overlays the upstream surface between apertures of the aperture array, the PTFE-based layer being conformally disposed over the upstream surface of the plate body and spanning the upstream surface between the apertures of the aperture array to slow deposition of carbonaceous deposits on the filter screen.

In certain embodiments, the plate body can include sheet body. The sheet body can include stainless steel. The sheet body can be perforated. The plate body can be arranged to exhibit substantially no creep when arranged obliquely or orthogonally to a fluid flow and having a pressure drop greater than 50 pounds per square inch between the upstream and downstream surfaces of the filter screen. It is contemplated that the plate body can have a periphery conforming to that of a last-chance filter screen, such as a last-chance filter screen placed immediately upstream of a flapper-type servo nozzle actuator to prevent entrained debris from blocking the gap of the nozzle actuator.

In accordance with certain embodiments, a PTFE-based coating can overlay the downstream surface of the plate body. The PTFE-based coating overlaying the upstream surface and/or the downstream surface can be conformal with the underlying surface. The PTFE-based coating overlaying the upstream surface and/or the downstream surface can overlay substantially all the underlying upstream and/or downstream surface. The PTFE-based coating overlaying the upstream surface and/or the PTFE-based coating overlaying the downstream surface can have a thickness that is less than about 50 microns (0.002 inches).

It is also contemplated that the plate body can define a thickness between the upstream surface and the downstream surface. The thickness of can be between about one and three times a width of the aperture extending through the pate body. The plate body can define an aperture wall extending between the upper surface and the lower surface. The aperture wall can be free of the PTFE-based coating. A portion of the aperture wall can have a layer of PTFE-based coating conformally disposed thereon. Substantially the entire aperture wall can have a layer of PTFE-based coating conformally disposed over the aperture wall. It is further contemplated that the aperture can have a width that within a range between about 40 microns (0.0016 inches) and about 200 microns (0.01 inches).

A nozzle servo actuator for a fuel-draulic system includes a flapper element operably connected to a drive. A fuel nozzle having one or more outlets is offset from the flapper body by a nominal gap width. A filter screen as described above is disposed upstream of the fuel nozzle outlet, apertures of filter screen aperture array having widths that are smaller than the nominal gap width separating the flapper element from the fuel nozzle. In embodiments, the nominal gap width is between about 75 microns (0.003 inches) and about 125 microns (0.005 inches). In certain embodiments, the filter screen is disposed immediately upstream of the fuel nozzle outlet. It is contemplated that a fuel-oil cooler can be disposed upstream of the filter screen.

A method of making a filter screen for a fuel-draulic system includes defining an aperture array in a plate body and depositing a PTFE-based coating conformally over an upstream surface of the plate body. The aperture array can be defined prior to depositing the PTFE-based coating. The aperture array can be defined after depositing the PTFE-based coating. Apertures of the aperture array can be defined using a laser drilling technique. Depositing the PTFE-based coating can include applying a liquid and baking the liquid. The PTFE-based coating can be deposited using an initiated chemical vapor deposition technique.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2 is a cross-section side view of a portion of the fuel system of FIG. 1, showing the filter screen arranged in a 'last chance' filter arrangement;

FIG. 3 is a plan view of the filter screen of FIG. 1, showing the plate body and aperture array of the filter screen;

FIGS. 4-7 are particle cross-sectional side views of embodiments of the filter screen of FIG. 1, showing surfaces of the plate body of the filter screen.

DETAILED DESCRIPTION OF THE PREFERRED EMBODIMENTS

Figure 1:
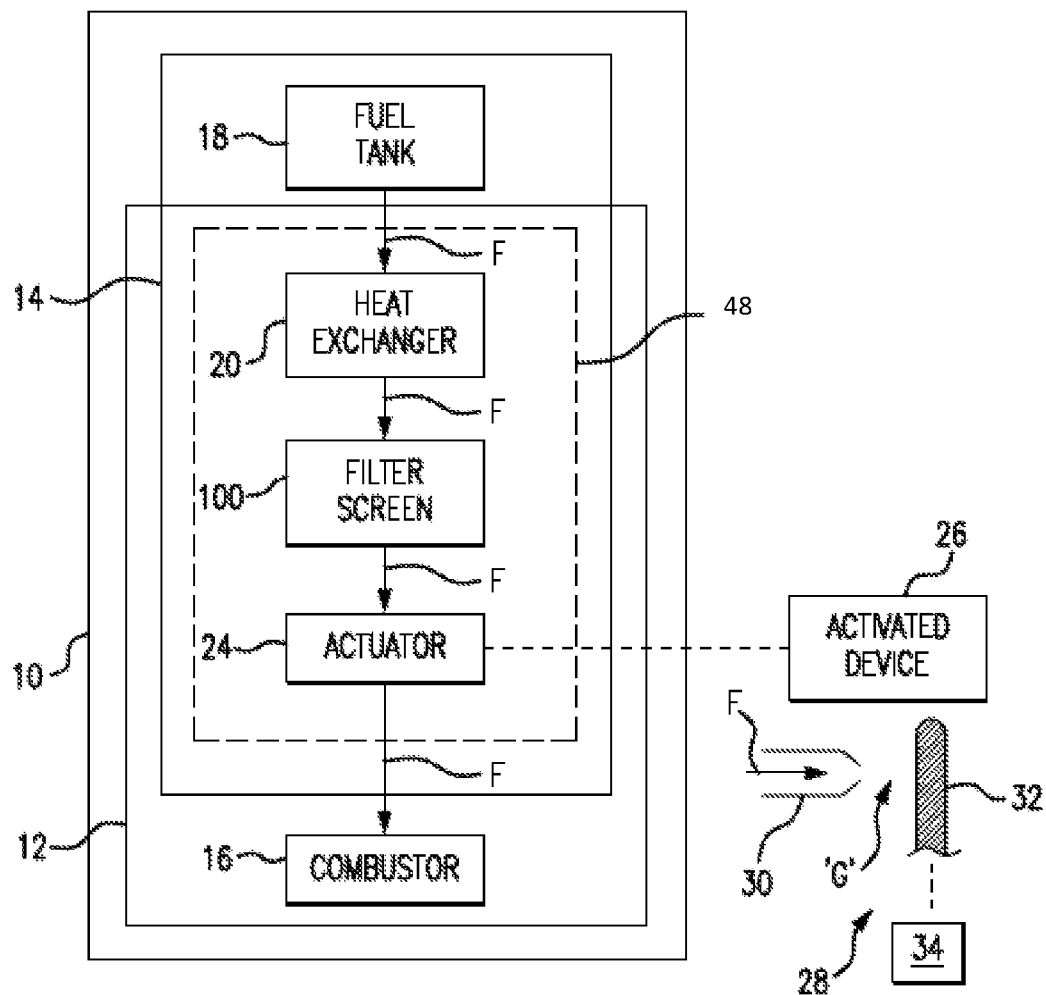
FIG. 1 is a schematic view of an exemplary embodiment of an aircraft constructed in accordance with the present disclosure, showing fuel system with a filter screen in fluid communication with a fuel tank and a gas turbine engine.

Reference will now be made to the drawings wherein like reference numerals identify similar structural features or aspects of the subject disclosure. For purposes of explanation and illustration, and not limitation, a partial view of an exemplary embodiment of a filter screen in accordance with the disclosure is shown in FIG. 1 and is designated generally by reference character 100. Other embodiments of filter screens, servo nozzle actuators in gas turbine engine fuel systems employing such filter screens, and methods of making such filter screens in accordance with the disclosure, or aspects thereof, are provided in FIGS. 2-8, as will be described. The systems and methods described herein can be used for 'last chance' filter screens in fuel and/or lubrication systems, though the present disclosure is not limited to fuel systems, lubrication systems, or any other particular type of filter screen application.

Referring to FIG. 1, an aircraft 10 is shown. Aircraft 10 includes a gas turbine engine 12 and a fuel system 14. Gas turbine engine 12 includes a combustor 16 that accepts fuel F delivered by the fuel system 14 for combustion, thereby powering aircraft 10. Aircraft 10 and the gas turbine engine 12 can include additional components not specifically shown.

In the exemplary illustrated embodiment, fuel system 14 includes a fuel tank 18, a heat exchanger 20, filter screen 100, and one or more actuators 24 operably connected to an actuated device 26. Fuel tank 18 is carried on aircraft 10 and can store a suitable hydrocarbon-based fuel for gas turbine engine 12, such as known fuel formulations like Jet A and Jet A-1 (defined by industry specification ASTM D 1655) or JP-8 (defined by military specification MIL-DTL-83133). Heat exchanger 20 (e.g., a fuel/oil heat exchanger) is in fluid communication with fuel tank 18. Filter screen 100 is in fluid communication with heat exchanger 20. Actuator 24 is in fluid communication with filter screen 100, and is in further fluid communication with combustor 16 and/or fuel tank 18, as suitable for a given application. It is to be appreciated and understood that exemplary fuel system 14 is provided for purposes of illustration purposes only, is not limiting, and can include additional components not shown, such as a fuel pump and a fuel metering unit, and can have other configurations and arrangements as desired for particular applications.

In the illustrated exemplary embodiment, actuator 24 includes a nozzle servo actuator 28. Nozzle servo actuator 28 includes a fuel nozzle 30 and a flapper element 32. Flapper element 32 is operably connected to drive 34 for actuating actuated device 26, which may be a flight control device on a movable engine element like a bleed valve. Fuel nozzle 30 is separated from flapper element 32 by a nominal gap width G. As will be appreciated by those of skill in the art, movement of flapper element 32 by drive 34 changes resistance to fuel issuing from fuel nozzle 30, thereby actuating actuated device 26. Filter screen 100 is arranged to remove particles approximating the size of nominal gap width G to prevent particles lodging between flapper element 32 and fuel nozzle 30, which could otherwise present resistance to drive 34. In certain embodiments, nominal gap width G is between about 75 microns (0.003 inches) and about 125 microns (0.005 inches), and filter screen 100 is configured and adapted to impound particles of size larger than 75 microns (0.003 inches) and about 125 microns (0.005 inches) upstream of nozzle servo actuator 28.

During operation, thermal energy is transferred to fuel F passing through the heat exchanger 20. Portions of fuel system 14 from the heat exchanger 20 downstream to combustor 16 of gas turbine engine 12 are generally referred to as a hot section 48, indicated in FIG. 1 with dashed outline. Fuel traversing (or resident) in hot section 48 is generally at an elevated operating temperature, that is, it is at a temperature generally greater than room temperature or ambient temperature. In certain embodiments, fuel F in hot section 48 reaches an operating temperature of at least about 135 degrees Celsius (275 degrees Fahrenheit) while impinging upon and traversing filter screen 100. As will be appreciated by those of skill in the art in view of the present disclosure, heating fuel F to such temperature can have increased likelihood of depositing carbonaceous deposits upon structure, e.g., filter screen 100, in fluid contact with fuel F.

With reference to FIGS. 2 and 3, filter screen 100 is shown. Filter screen 100 is disposed immediately downstream of heat exchanger 20, receives therefrom fuel flow F. Filter screen 100 is disposed immediately upstream of actuator 24, and provides thereto fuel flow F. In the illustrated exemplary embodiment filter screen 100 is a 'last chance' filter screen, meaning that there are no intervening filtering elements interposed between filter screen 100 and actuator 24. Entrained particulate P having a particle size that is smaller than width 102 of apertures 116 traverses filter screen 100 and is conveyed by fuel flow F to actuator 24. Width 102 is therefore smaller than gap width G. In certain embodiments, within a range between about 40 microns (0.0016 inches) and about 200 microns (0.01 inches), thereby preventing entrained material with size sufficient to lodge between fuel nozzle 30 and flapper element 32 from reaching actuator 24. In certain embodiment, width 102 is about than 120 microns (0.005 inches), providing consistent filtering performance.

Filter screen 100 includes a plate body 110 with an upstream surface 112, an opposed downstream surface 114, and an array of apertures 116 extending between upstream surface 112 and downstream surface 114. A polytetrafluoroethylene (PTFE)-based layer 118 overlays upstream surface 112 between apertures 116 of the aperture array, PTFE-based layer 118 being conformally disposed over upstream surface 112 of plate body 110 and spanning upstream surface 114 between apertures 116 of the aperture array to slow deposition of carbonaceous deposits on filter screen 100.

PTFE-based layer 118 is catalytically inactive with respect to typical hydrocarbon-based gas turbine engine fuels. PTFE-based layer 118 also reduces the ability of carbonaceous materials present in fuel from adhering to upstream surface 112 of filter screen 100. PTFE-based layer 118 is also fuel resistant, anti-fouling, is thermally stable at or above elevated gas turbine engine fuel system operating temperatures, and is durable. It is contemplated that PTFE-based layer 118 can be disposed over the entirety of upstream surface 112.

As illustrated in FIG. 3, plate body 110 is a perforated sheet body constructed from stainless steel. Constructing plate body 110 as a perforated sheet body with stainless steel enables filter screen 100 to exhibit substantially no creep when arranged obliquely or orthogonally to fluid flow F at relatively high pressures, e.g., pressure drops greater than 50 pounds per square inch (psi) between upstream surface 112 and downstream surface 114 of filter screen 100. Plate body 110 also includes a periphery 120 conforming to that of a last-chance filter screen, such as a flapper-type servo nozzle actuator, enabling filter screen 100 to serve as a drop in replacement for an uncoated filtering element of similar geometry.

With reference to FIGS. 4-7, embodiments of filter screens are shown. Referring to FIG. 4, plate body 110 can defines one or more apertures 116 that extend between upstream surface 112 and downstream surface 114. PTFE-based layer 118 is disposed over the entirety of upstream surface 112. Walls of apertures 116 are uncoated, i.e. substantially no PTFE-based layer 118 being disposed over the walls of apertures 116 between the upper surface and the lower surface. Such screens provide both fouling resistance and ease of manufacture.

Referring to FIG. 5, a filter body 200 is shown. Filter screen 200 is similar to filter screen 100, and additionally includes a PTFE-based coating 230 disposed over the entirely of downstream surface 214. Such filters can provide additional fouling resistance in fuel systems where coking tends to develop on both the upstream and downstream surfaces of the filter screen, such as when flow through the filter screen is intermittent.

Referring to FIG. 6, a filter screen 300 is shown. Filter screen 300 is similar to filter screen 100, and additionally includes a PTFE-based coating 334 disposed over a portion of aperture wall 316, a portion 332 of aperture wall 316 being uncoated. This provides fouling resistance in arrangements where fouling occurs more rapidly on the upstream surface than on the downstream surface of the filter screen. Although illustrated as being adjacent to the upstream surface of the filter screen, it is to be understood and appreciated that the coated wall portion can be adjacent to the downstream surface of the filter screen. This provides fouling resistance in arrangements where fouling occurs more rapidly on the downstream surface than on the upstream surface of the filter screen. Extending the PTFE-based coating into the apertures of the filter screen body improves adherence of the PTFE-based coating to the filter screen body, reducing the need for the PTFE based coating to adhere to the underlying substrate of the filter screen body.

Referring to FIG. 7, a filter screen 400 is shown. Filter screen 400 is similar to filter screen 100, and additionally includes a PTFE-based coating 434 disposed within aperture 416 and overlaying substantially the entire area of a wall 418 of aperture 416. Disposing PTFE-based coating 434 within aperture 416 and overlaying substantially over the entire area of wall 418 provides additional fouling resistance, which can extend the service life of filter screens in fuel systems where carbonaceous deposits tend to develop within the filter screen apertures, such as in fuel systems heated fuel is stagnant within the apertures for extended time intervals. Encapsulating the entire filter screen body simplifies fabrication of the filter screen body as PTFE-based coating adheres to itself, reducing the need for the PTFE based coating to adhere to the underlying substrate of the filter screen body.

Compositions of both an organic composition (such as fluoropolymers, fluorocarbons and various proprietary formulations provided by coatings suppliers) and an inorganic composition (such as titanium nitride, boron carbide, chromium nitride, diamond-like coatings, etc.) shows that both types of compositions can acquires carbonaceous deposits. However, some coatings are less amenable to carbonaceous deposit formation. Applicants' research indicates that coating surface chemistry as well as the capability of the coating process to deposit a coherent, defect-free film covering substantially the entire plate body of the filter screen influences coating performance.

In particular, it was observed that most of the typical "release coatings", i.e. polymeric and inorganic materials used as anti-stick surfaces, for applications ranging from food packaging and preparation to mold release, exhibit essentially no better performance at the relevant fuel-draulic operating conditions than uncoated control samples (untreated stainless steel surfaces). Of the compositions evaluated, a monolithic PTFE body exhibited the least amount of carbonaceous deposits when exposed to long-duration impinging flow of hot jet fuel. Because PTFE is highly susceptible to creep, a monolithic PTFE screen could not sustain its shape under fuel-draulic system pressure; therefore, a metal screen having a PTFE coating would offer the highest resistance to blocking from carbonaceous deposits under aircraft fuel-draulic conditions.

Figure 8:
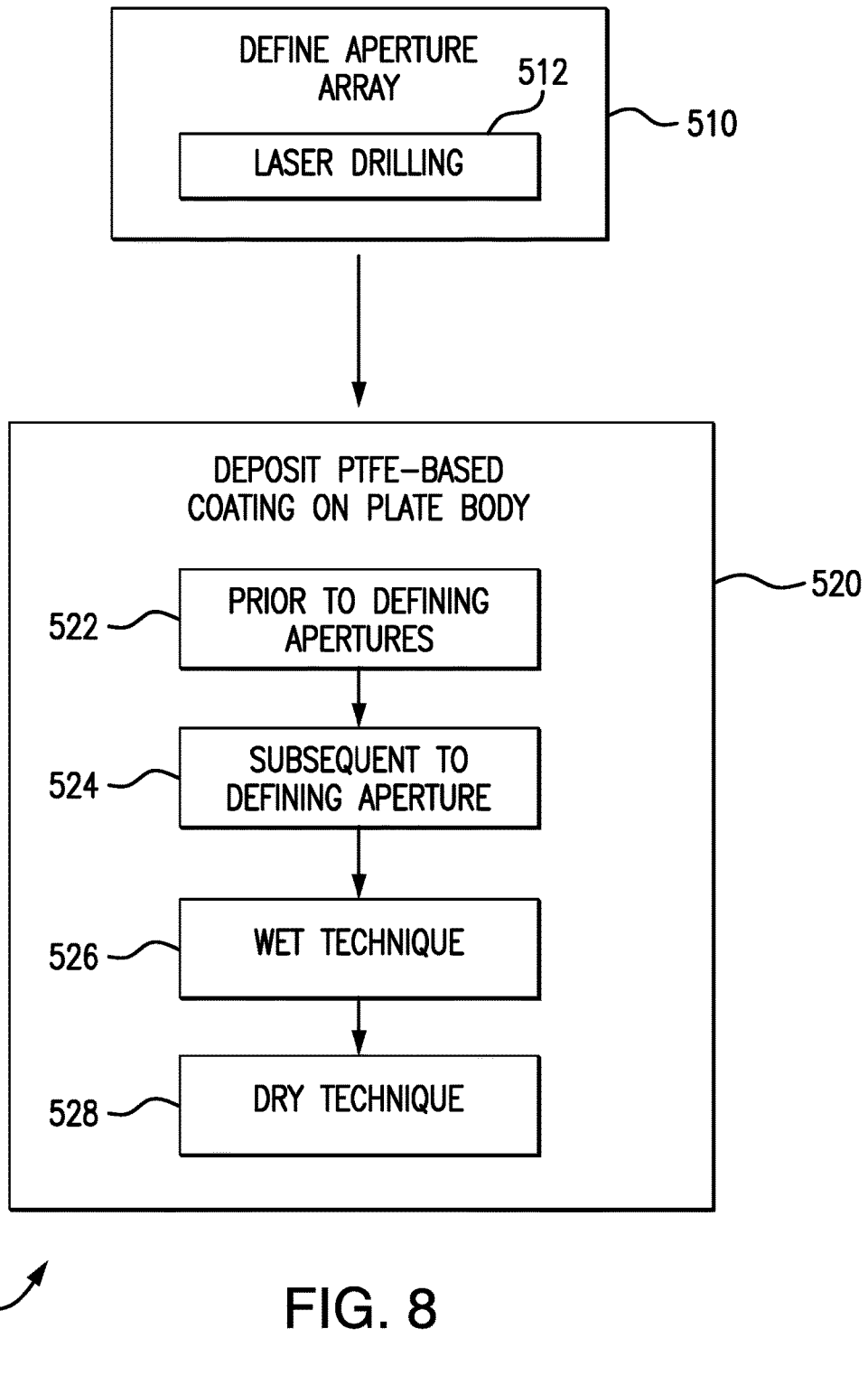
FIG. 8 is a block diagram of a method of making a filter screen.

With reference to FIG. 8, a method 500 of making a filter screen, e.g., filter screen 100 (shown in FIG. 1), is shown. Method 500 includes defining an array of apertures, e.g., apertures 116, aperture array in a plate body, e.g., plate body 110 (shown in FIG. 3), as shown with box 510. Apertures of the aperture array can be defined prior to depositing the PTFE-based coating, as shown with box 522.

A PTFE-based coating, e.g., PTFE-based coating 108, is conformally over an upstream surface, e.g., upstream surface 112 (shown in FIG. 2) of the plate body, as shown in box 520. It is contemplated that PTFE-based coatings can be disposed on both upstream and downstream surfaces of the plate body. In certain embodiments, a PTFE coating of between about one micron (0.00005 inches) to about 2 microns (0.0001) thickness can be deposited using a wet technique, as shown with box 526. The wet technique can include spraying the plate and subsequently baking the sprayed plate body. In accordance with certain embodiments, the PTFE-based coating can be deposited using a dry technique such as a chemical vapor deposition (CVD) technique, as shown with box 520. The CVD technique can be an initiated CVD technique, which advantageously enables deposition of an extremely flat, thin coating over the entire upstream and/or downstream surface of the plate body.

Apertures of the aperture array can be defined (or re-defined) after depositing the PTFE-based coating, as shown with box 524. It is contemplated that the apertures of the aperture array can be defined using a laser drilling technique, as shown with box 512. Laser drilling has the advantage that sufficient filter screen open area can be defined while retaining suitable strength in the plate body, the filter screen thereby having a burst strength that is about one and a half times the maximum pressure that the fuel system exerts on the screen body.

In embodiments described herein, filter screens include a plate body having a PTFE-based coating that resists carbonaceous deposition accumulation for relatively long time periods when exposed to fuel flows with temperatures associated with coking. In certain embodiments, the plate body is arranged to provide structural support for PTFE-based materials that otherwise exhibit unacceptable creep in flow conditions present in fuel-draulic systems. It is contemplated that filter screens described herein can be arranged as drop-in replacements filter elements that are more apt to accumulate carbonaceous deposits when exposed to fuel flows with temperatures associated with coking.

The methods and systems of the present disclosure, as described above and shown in the drawings, provide for filter screens with superior properties including improved service life. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A filter screen, comprising:
   a plate body having an upstream surface, a downstream surface, and an array of apertures extending between the upstream surface and the downstream surface; and
   a polytetrafluoroethylene (PTFE)-based layer overlaying the upstream surface between apertures of the aperture array, wherein the PTFE-based layer is conformably disposed over the upstream surface of the plate body and spans the upstream surface between the apertures of the aperture array, wherein the plate body defines interior aperture walls extending between the upstream surface and downstream surface, the aperture walls including at least a first portion free of the PTFE-based layer, and wherein the aperture walls includes a second portion where a thickness of the aperture walls gradually reduces.

2. The filter screen as recited in claim 1, wherein the plate body comprises a perforated sheet body formed from stainless steel.

3. The filter screen as recited in claim 1, wherein the apertures have aperture widths that are within a range between 40 microns (0.0016 inches) and 200 microns (0.01 inches).

4. The filter screen as recited in claim 1, wherein the PTFE-based coating has a thickness that is less than or equal to 50 microns (0.002 inches).

5. The filter screen as recited in claim 1, further comprising a PTFE-based layer overlaying the downstream surface between the apertures of the aperture array.

6. The filter screen as recited in claim 5, wherein the PTFE-based layer overlaying the downstream surface is conformably disposed over the downstream surface of the plate body.

7. The filter screen as recited in claim 5, wherein the PTFE-based layer overlaying the downstream surface is conformably disposed over the downstream surface and spans the downstream surface between the apertures of the aperture array.

8. The filter screen as recited in claim 1, wherein the PTFE-based layer covers a portion of the wall.

9. The filter screen as recited in claim 1, wherein the PTFE-based layer covers a length of the wall between the upstream surface and the downstream surface.

10. The filter screen as recited in claim 1, wherein at least one of the interior aperture walls is uncoated.

11. A nozzle servo actuator for a fuel-draulic system, comprising:
    a flapper element operably connected to a drive;
    a fuel nozzle having an outlet, the outlet being offset from the flapper element by a nominal gap width; and
    a filter screen as recited in claim 1 disposed upstream of the outlet of the fuel nozzle, the apertures of the filter screen having widths that are smaller than the nominal gap width separating the outlet from the flapper element.

12. The nozzle servo actuator as recited in claim 11, wherein the nominal gap width is between 75 microns (0.003 inches) and 125 microns (0.005 inches).

13. The nozzle servo actuator as recited in claim 11, wherein the filter screen is disposed immediately upstream of the outlet.

14. A fuel-draulic system for a gas turbine engine, comprising:
    a nozzle servo actuator as recited in claim 11;
    a fuel-oil cooler disposed upstream of the filter screen for removing ice from fuel flowing to the filter screen.

15. A method of making a filter screen for a fuel-draulic system, comprising:
    defining an aperture array in a plate body; and
    depositing a polytetrafluoroethylene (PTFE)-based coating conformably over an upstream surface of the plate body, wherein the plate body defines interior aperture walls extending between the upstream surface and a downstream surface of the plate body, the aperture walls including at least a first portion free of the PTFE-based layer, and wherein the aperture walls includes a second portion where a thickness of the PTFE-based layer gradually reduces.

16. The method as recited in claim 15, wherein the aperture array is defined prior to depositing the PTFE-based coating.

17. The method as recited in claim 15, wherein the aperture array is defined subsequent to depositing the PTFE-based coating.

18. The method as recited in claim 15, wherein defining the aperture array includes laser drilling apertures of the aperture array through the plate body.

19. The method as recited in claim 15, wherein depositing PTFE-based coating comprises (a) applying a liquid precursor to the upstream surface of the plate body, and (b) baking the plate body and applied liquid.

20. The method as recited in claim 15, wherein depositing PTFE-based coating comprises depositing the PTFE-based coating using an initiated chemical vapor deposition technique.

* * * * *